Patented Mar. 10, 1936

2,033,180

UNITED STATES PATENT OFFICE 2,033,180

LEAVENED BREAD MANUFACTURE

Herbert H. Bunzell, New York, N. Y.

No Drawing. Application July 17, 1931,
Serial No. 551,351

4 Claims. (Cl. 99—10)

This invention relates to the manufacture of bread doughs leavened with yeast or its equivalent and to bread obtained therefrom.

The present invention has for its basis the discovery that the inclusion of urea in the dough results in a bread which retains its softness for a longer period, has a better flavor, and color and a greater volume than a bread made from the same ingredients but with urea omitted. More particularly do such results follow if in conjunction with the urea an acid engendering substance to neutralize the alkaline condition set up by the decomposition of the urea is included and preferably in amounts to maintain a pH value of about 5. For this purpose ammonium salts such as the sulfate or the phosphate (and to a less extent the chloride) are found eminently satisfactory and are preferred for the reason that these ammonium compounds reduce the quantity of urea found necessary to effect a desired result while at the same time the required condition of acidity is secured. The maintenance of an acid condition is conductive to fermentation and is furthermore desirable as a preventative of rope formation in bread.

A large batch of dough, that is one weighing about 1000 pounds, and including about 600 pounds of flour, in accordance with this invention, is treated with from 0.25 to 1 pound and preferably with about 0.5 pound of a mixture of urea and ammonium sulfate. In the preferred proportion the mixture comprises about equal parts by weight of each ingredient, though this ratio can be varied from urea alone to materially preponderant amounts of ammonium sulfate; the acid concentration desired in the dough will generally be the controlling factor in determining the relative amounts.

Other ingredients can be added or substituted in the mixture, such as amino acids. For example I find that products obtained by the digestion of casein with pepsin can be included with good results, as for instance, about one pound to each pound of urea. Also urease, or soy bean meal which contains urease, can be included in the mixture or in the dough ingredients to promote the decomposition of urea and the consequent release of ammonia. About .01 part of urease for each part urea are found suitable and apparently the urea amount can be reduced in proportion to the amount of urease added within the limits indicated.

The mixture is preferably dissolved in the water added to the flour, sugar, shortening and milk products or other ingredients from which the dough is made to thereby secure uniform distribution. The yeast suspended in water is thereupon added in accordance with the customary methods of operation. Any other suitable method of incorporating the mixture can be followed. The dough is handled and treated in the customary way to make bread either as a straight dough in which all the ingredients are added at the beginning or as sponge dough in which a portion of the ingredients is included in a later stage; the invention is applicable to either form.

I claim:

1. In a process of manufacturing leavened bread the step which comprises including a small proportion of a mixture of urea and an ammonium salt as an ingredient of the bread dough.

2. In a process of manufacturing leavened bread the step which comprises including from .25 to 1 pound of a mixture of equal parts by weight of urea and ammonium sulfate as an ingredient of each 1000 pounds of bread dough.

3. A leavened dough for bread including from .25 to 1 pound of a mixture of equal parts of urea and ammonium sulfate to each 1000 pounds of dough.

4. Leavened dough for bread including a mixture of urea and an ammonium salt in proportions to maintain a pH value of about 5.

HERBERT H. BUNZELL.